US 8,827,016 B2

(12) United States Patent
Viengchai

(10) Patent No.: US 8,827,016 B2
(45) Date of Patent: Sep. 9, 2014

(54) HYBRID VEHICLE WITH MULTIPLE ENERGY SUB-SYSTEMS

(75) Inventor: Prasit Viengchai, Paris (FR)

(73) Assignee: High Gas Mileage, LLC, Orlando, FL (US)

( * ) Notice: Subject to any disclaimer, the term of this patent is extended or adjusted under 35 U.S.C. 154(b) by 246 days.

(21) Appl. No.: 13/455,835

(22) Filed: Apr. 25, 2012

(65) Prior Publication Data

US 2012/0267179 A1     Oct. 25, 2012

Related U.S. Application Data

(60) Provisional application No. 61/478,574, filed on Apr. 25, 2011.

(51) Int. Cl.
| B60K 6/00 | (2006.01) |
| B60K 6/52 | (2007.10) |
| B60W 20/00 | (2006.01) |
| B60W 10/04 | (2006.01) |
| B60K 6/12 | (2006.01) |

(52) U.S. Cl.
CPC ............. *B60K 6/52* (2013.01); *Y02T 10/6282* (2013.01); *B60Y 2400/15* (2013.01); *Y02T 10/6265* (2013.01); *B60K 2006/123* (2013.01); *B60K 6/12* (2013.01); *Y02T 10/6208* (2013.01); *B60W 20/00* (2013.01); *B60W 10/04* (2013.01)
USPC ................... 180/65.21; 180/65.265

(58) Field of Classification Search
CPC ............. B60K 6/00; B60K 6/20; B60K 6/12; B60L 1/003; B60L 2260/28; B60L 11/002; B60L 11/126; B60L 11/1861; B60L 11/1877; Y02T 10/6217; Y02T 10/6208; Y02T 10/6282; Y02T 10/7077; Y02T 10/7044; Y02T 10/7005; Y02T 10/705; Y02T 90/14
USPC ................. 180/65.21, 65.22, 65.265, 65.275, 180/65.28, 65.285, 65.31, 302
See application file for complete search history.

(56) References Cited

U.S. PATENT DOCUMENTS

| 865,496 | A | * | 9/1907 | Herrington | .............. 60/412 |
| 1,963,091 | A | * | 6/1934 | Jenkins | ............... 180/302 |

(Continued)

FOREIGN PATENT DOCUMENTS

| JP | 09-267647 | 10/1997 |
| WO | 02-092373 | 11/2002 |
| WO | 2005-044610 | 5/2005 |

OTHER PUBLICATIONS

International Searching Authority; PCT Transmittal of International Search Report and Written Opinion of the International Searching Authority dated Nov. 29, 2012, entire document.

*Primary Examiner* — Hau Phan
*Assistant Examiner* — Jacob Meyer
(74) *Attorney, Agent, or Firm* — Allen, Dyer, Doppelt, Milbrath & Gilchrist, P.A.

(57) ABSTRACT

A hybrid vehicle includes a frame, at least two wheels carried by the frame, an internal combustion subsystem driving at least one of the two wheels, an electrical subsystem driving at least one of the two wheels and recapturing kinetic energy during deceleration events, a pneumatic subsystem driving at least one of the two wheels and recapturing kinetic energy during deceleration events, and a control subsystem selectively operating the internal combustion, electrical and pneumatic subsystems.

34 Claims, 6 Drawing Sheets

(56) References Cited

U.S. PATENT DOCUMENTS

| | | | |
|---|---|---|---|
| 3,379,008 A * | 4/1968 | Manganaro | 180/302 |
| 3,502,001 A * | 3/1970 | Moore | 91/49 |
| 3,503,464 A * | 3/1970 | Yardney | 180/65.245 |
| 3,704,760 A | 12/1972 | Maruyama | |
| 3,867,812 A * | 2/1975 | Van Arsdel | 60/39.15 |
| 3,925,984 A * | 12/1975 | Holleyman | 60/370 |
| 3,980,152 A * | 9/1976 | Manor | 180/313 |
| 4,123,910 A * | 11/1978 | Ellison, Sr. | 60/698 |
| 4,163,367 A * | 8/1979 | Yeh | 60/414 |
| 4,185,465 A * | 1/1980 | Shaw | 60/678 |
| 4,433,549 A * | 2/1984 | Zappia | 60/712 |
| 4,470,476 A | 9/1984 | Hunt | |
| 4,478,304 A * | 10/1984 | Delano | 180/165 |
| 4,578,955 A * | 4/1986 | Medina | 60/709 |
| 4,629,947 A * | 12/1986 | Hammerslag et al. | 318/161 |
| 4,798,053 A | 1/1989 | Chang | |
| 4,798,257 A * | 1/1989 | Kawamura et al. | 180/165 |
| 5,192,199 A * | 3/1993 | Olofsson | 417/406 |
| 5,247,795 A * | 9/1993 | McCullough | 60/605.1 |
| 5,460,239 A * | 10/1995 | Jensen | 180/302 |
| 5,755,303 A * | 5/1998 | Yamamoto et al. | 180/65.25 |
| 5,847,470 A * | 12/1998 | Mitchell | 290/45 |
| 5,901,809 A * | 5/1999 | Berkun | 180/301 |
| 6,044,924 A * | 4/2000 | Adli | 180/302 |
| 6,070,404 A * | 6/2000 | Bosley et al. | 60/772 |
| 6,223,846 B1 * | 5/2001 | Schechter | 180/165 |
| 6,460,350 B2 * | 10/2002 | Johnson et al. | 62/48.1 |
| 6,508,324 B1 * | 1/2003 | Conley, Jr. | 180/165 |
| 6,644,589 B2 * | 11/2003 | Woo et al. | 244/11 |
| 6,834,737 B2 * | 12/2004 | Bloxham | 180/165 |
| 7,028,482 B2 * | 4/2006 | Cho et al. | 60/698 |
| 7,111,704 B2 * | 9/2006 | Johnson | 180/307 |
| 7,451,850 B2 | 11/2008 | Tokunou | |
| 7,694,773 B2 | 4/2010 | Janson et al. | |
| 7,789,181 B1 | 9/2010 | Schecter | |
| 7,841,432 B2 * | 11/2010 | Lynn et al. | 180/65.21 |
| 7,874,389 B2 | 1/2011 | Feliss et al. | |
| 7,934,573 B2 * | 5/2011 | Fassnacht | 180/65.29 |
| 2001/0002379 A1 * | 5/2001 | Schechter | 477/115 |
| 2004/0237517 A1 * | 12/2004 | Cho et al. | 60/370 |
| 2005/0126837 A1 * | 6/2005 | Taxon | 180/65.2 |
| 2006/0170188 A1 * | 8/2006 | Negre et al. | 280/403 |
| 2006/0225941 A1 * | 10/2006 | Cole | 180/302 |
| 2007/0215396 A1 * | 9/2007 | Rask et al. | 180/65.3 |
| 2007/0295543 A1 * | 12/2007 | Fassnacht | 180/65.3 |
| 2009/0018716 A1 | 1/2009 | Ambrosio | |
| 2010/0000806 A1 | 1/2010 | Caudill | |
| 2010/0190603 A1 * | 7/2010 | Uchiyama | 477/27 |
| 2010/0243347 A1 * | 9/2010 | Uchiyama | 180/65.22 |
| 2012/0232728 A1 * | 9/2012 | Karimi et al. | 701/22 |

\* cited by examiner

HYBRID VEHICLE WITH MULTIPLE ENERGY SUB-SYSTEMS

CROSS-REFERENCE TO RELATED APPLICATION

This application claims the benefit of U.S. Provisional Application Ser. No. 61/478,574, filed on Apr. 25, 2011, the contents of which are herein incorporated by reference in their entirety.

FIELD OF THE INVENTION

The present invention relates to hybrid vehicles and the subsystems employed therein for driving the vehicles and recovering kinetic energy.

BACKGROUND OF THE INVENTION

Various factors have contributed to move hybrid vehicles from a niche market closer to the mainstream. While the early impetus for hybrid vehicles (or other "green" vehicles) was a reduction in the pollution generated thereby, the upward trend in oil prices has added an economic appeal to hybrid vehicles for some buyers. Additionally, improvements in hybrid technology have resulted in hybrid vehicles that, while still offering somewhat enhanced fuel efficiency, are marketed for enhanced performance relative to conventional vehicles.

However, hybrid vehicles remain prohibitively expensive for many prospective vehicle buyers, and particularly those hybrid vehicles which approximate the size and comfort of a conventional vehicle. Additionally, the efficiency gains of current commercially available hybrid vehicles are relatively modest in comparison to small conventional vehicles with high efficiency motors.

Electric-only vehicles are also appearing more prominently on the market, although the usefulness of such vehicles to many drivers as substitutes for conventional vehicles (unlike hybrid vehicles) remains limited by battery capacity. Batteries, in general, are an issue for electric-only and hybrid vehicles, as battery costs can be much higher than for conventional batteries. The high cost of batteries is aggravated by the need for multiple battery replacements during the anticipated life of many such vehicles.

Pneumatic motors and compressors have also been used with some success in vehicles. However, these systems, while promising in their own respect, have been the subject of only very limited incorporation with other vehicle energy systems.

SUMMARY OF THE INVENTION

In view of the foregoing, it is an object of the present invention to provide an improved hybrid vehicle. According to an embodiment of the present invention, a hybrid vehicle includes a frame, at least two wheels carried by the frame, an internal combustion subsystem driving at least one of the two wheels, an electrical subsystem driving at least one of the two wheels and recapturing kinetic energy during deceleration events, a pneumatic subsystem driving at least one of the two wheels and recapturing kinetic energy during deceleration events, and a control subsystem selectively operating the internal combustion, electrical and pneumatic subsystems.

According to an aspect of the present invention, the control subsystem includes at least one processor with machine readable memory configured to receive inputs of a battery charge, vehicle speed, air tank pressure and gas pedal position, and execute drive motor selection and kinetic energy recovery routines based on the received inputs.

These and other objects, aspects and advantages of the present invention will be better appreciated in view of the drawings and detailed description of preferred embodiments.

DETAILED DESCRIPTION OF PREFERRED EMBODIMENTS

Figure 1:
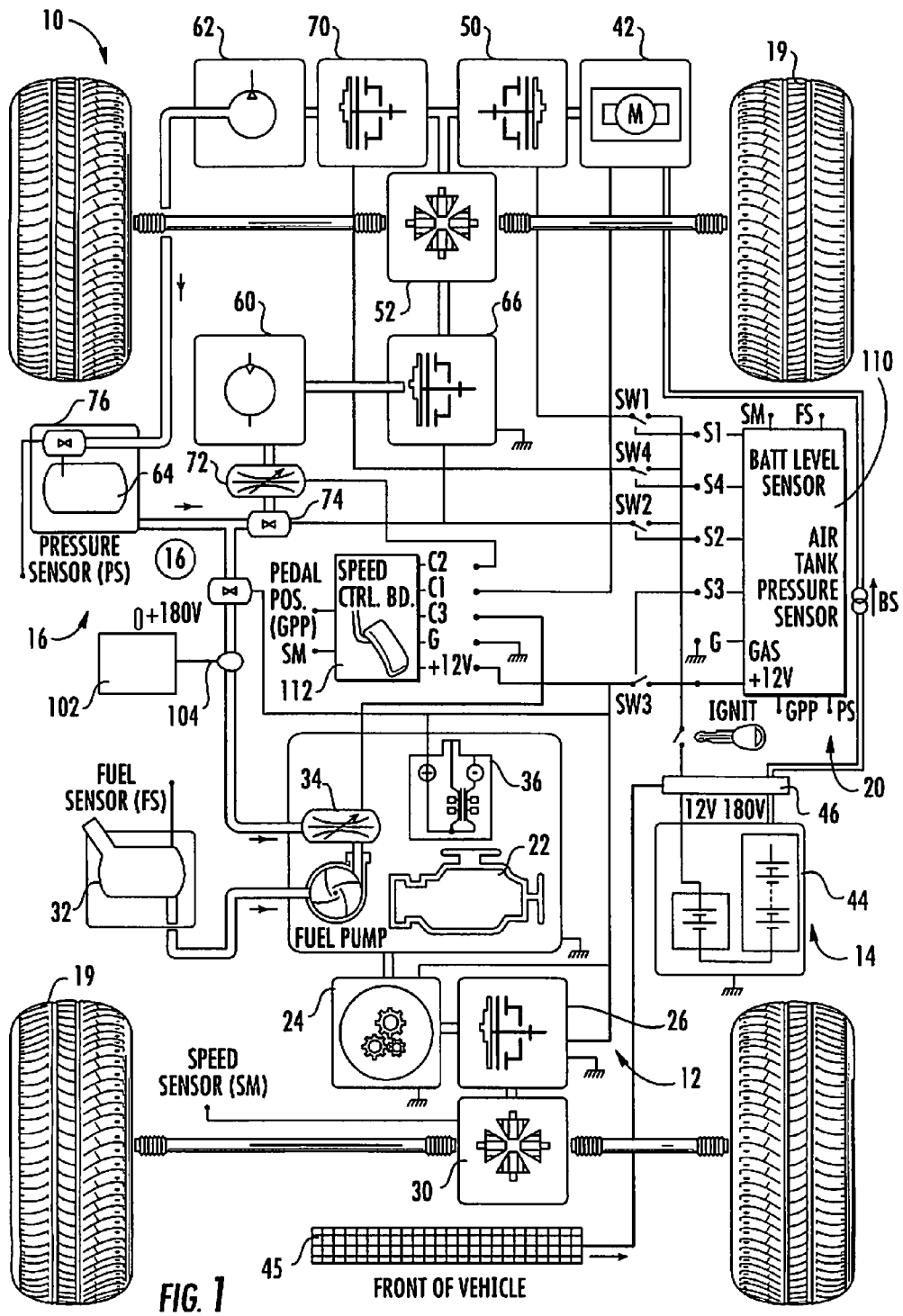
FIG. 1 is a schematic view of a hybrid vehicle, according to an embodiment of the present invention.

Referring to FIG. 1, according to an embodiment of the present invention, a hybrid vehicle 10 includes an internal combustion subsystem 12, an electrical subsystem 14 and a pneumatic subsystem 16. The subsystems 12, 14, 16 are commonly mounted on a frame 18 (see FIG. 6) that carries wheels 19. "Frame" as used herein refers generically to a vehicle support structure, and is not necessarily limited to a particular type of frame. For example, a multi-part chassis and a unibody would both be considered "frames."

The electrical subsystem 14 and pneumatic subsystem 16 include motors to drive the vehicle and kinetic energy recovery devices to recapture kinetic energy during braking and/or other vehicle deceleration. The term "deceleration event" is generically used herein to indicate an event during kinetic energy can be recaptured, regardless of whether the vehicle speed actually decreases—for example, braking to maintain speed, or limit a speed increase, while traveling downhill would be considered a "deceleration event."

A control subsystem 20 monitors and controls the components of the internal combustion, electrical and pneumatic sub-systems 12, 14, 16. As will be described in detail below, additional efficiency gains can be realized in connection with the subsystems 12, 14, 16 and other components.

The internal combustion subsystem 12 includes an internal combustion engine 22, which drives the vehicle through a transmission 24, a clutch 26 and a differential 30. The internal combustion engine 22 is powered by the combustion of fuel from a fuel tank 32 and air. The power level of the internal combustion engine 22 is monitored and controlled by the control subsystem 20 based on operational requirements.

The internal combustion engine 22 is preferably a four-stroke gasoline or diesel engine. The introduction of air into the engine 22 is regulated by a throttle valve 34. Depending on design, the introduction of fuel 32 can also be regulated by the throttle valve 34, by fuel injectors and/or by other mechanisms. Again depending on design, the engine 22 can include spark plugs 36 or the like.

To allow the engine 22 to run at its most efficient speed, the transmission 24 can include a continuously-variable transmission (CVT), although other transmission types can be used. A reverse gear should be incorporated to permit rearward motion of the vehicle 10 powered by the engine 22.

The clutch 26 is interposed between the transmissions 24 and the differential 30, and is preferably a low power consumption electric clutch. The use of an electric clutch reduces internal friction when the clutch 26 is not engaged, and is reduces overall vehicle weight relative to other clutch types. However, other clutch types could be used in connection with the present invention. Locating the clutch 26 proximate to the differential 30 helps reduce the weight of extraneous drive train components being rotated when not in use, thereby increasing efficiency.

The differential 30 is preferably a front differential, which is engaged only by the internal combustion subsystem 12, while the electrical and pneumatic subsystems 14, 16 work through a rear differential. This arrangement is preferred at least for mechanical simplicity and facilitating the physical layout of sub-system 12, 14, 16 components. The present invention is not necessarily limited to any specific type of differential.

Figure 2:
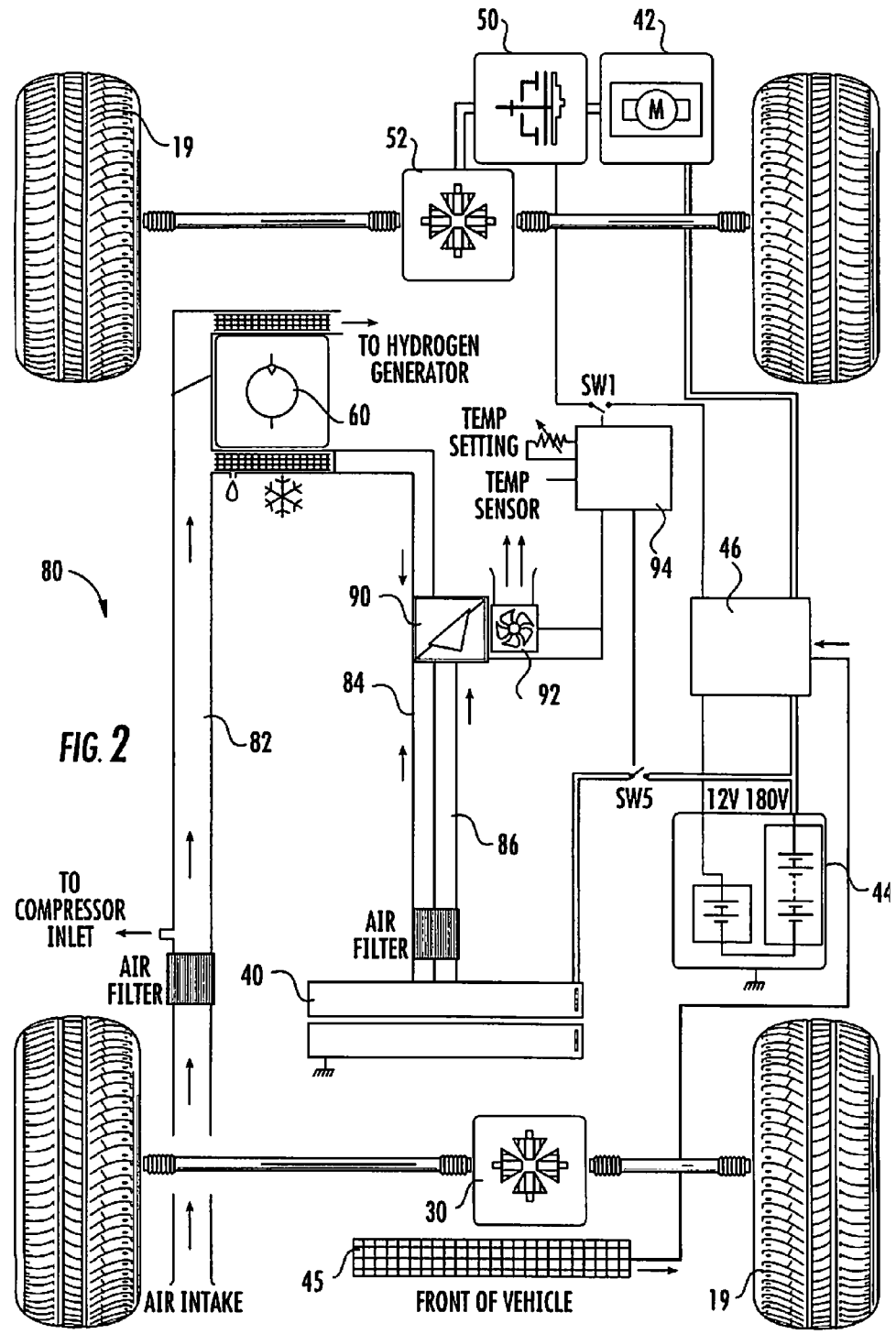
FIG. 2 is a detail schematic view of heating and cooling components of the vehicle of FIG. 1.

Referring to FIG. 2, excess heat is removed from the internal combustion engine 22 by coolant and dissipated by a radiator 40. At least a portion of the energy represented by the excess heat of the internal combustion engine 22 can be recaptured for various purposes, as will be described in greater detail below.

Figure 3:
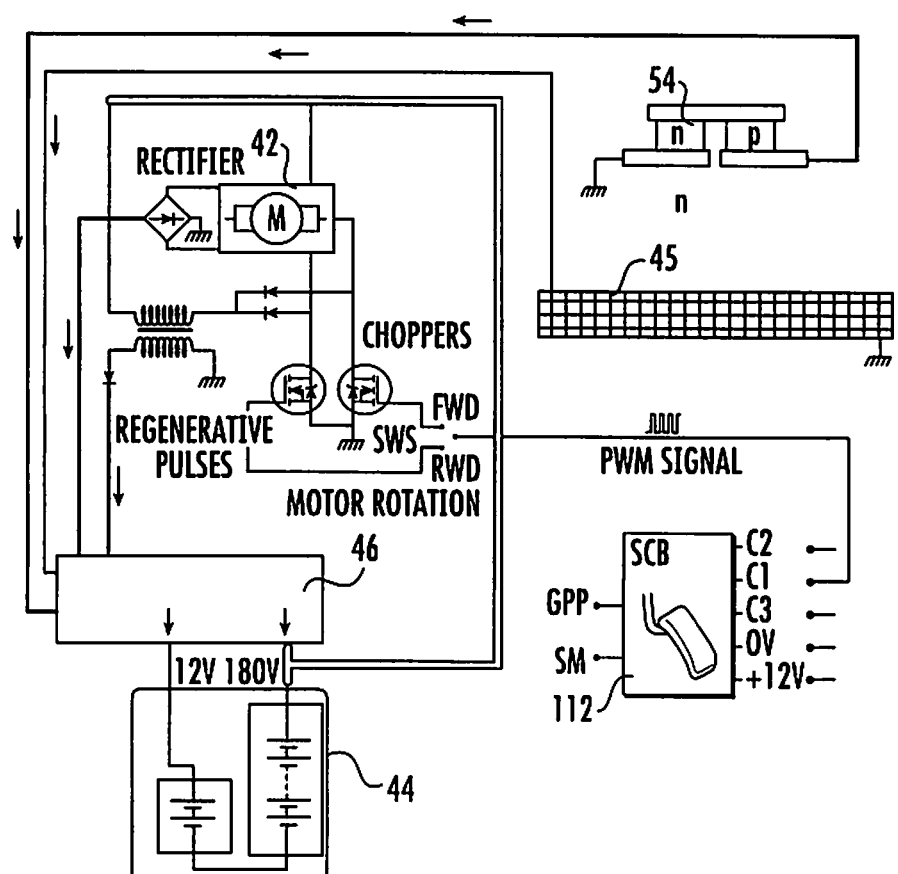
FIG. 3 is a detail schematic view of the electric motor controller and the charging components of the vehicle of FIG. 1.

Referring to FIGS. 1-3, the electrical subsystem 14 includes an electric motor 42, batteries 44, photovoltaic elements 45 and a charge regulator 46. The electric motor 42 drives and is driven by the vehicle 10 through an electric clutch 50 and differential 52.

The electric motor 42 is preferably an asynchronous induction regenerative motor with field induction current being supplied as a pulse width modulated (PWM) signal. When in use as a motor, the current is supplied by the batteries 44. When used to recapture kinetic energy during braking and/or other deceleration, the induced current is routed back to the batteries 44, via a regulator 46, for charging. The use of a regenerative motor with PWM induction current is mechanically simpler, lighter and more efficient than a separate motor and generator, although the present invention is not necessarily limited thereto.

The batteries 44 preferably include at least one high voltage battery and at least one low voltage battery. Multiple cells can be employed in each battery, as desired. The high voltage battery (e.g., approximately 180 volts DC nominal voltage) is used primarily for driving the electric motor and the low voltage battery (e.g., approximately 12 volts DC nominal voltage) is used to power the control sub-system 20 and other vehicle loads, such as the spark plugs 36, car stereo, vehicle lighting on low power consumption LED technology, and the like.

Relatively exotic newer batteries are not required, although the present invention does not necessarily exclude their use. For example, the low voltage battery can advantageously be a conventional car battery, and the high voltage battery could be constituted from multiple nickel metal hydride battery cells (Ni-MH).

The charge regulator 46 is preferably a microprocessor controlled unit in signal communication with the control sub-system 20 to facilitate regulation of battery 44 charge. The charge regulator 46 can be configured to perform functions including monitoring the battery 44 state of charge, regulating charging voltage and/or current and selectively charging the high and/or low voltage battery.

The clutch 50 is preferably another electric clutch located proximate to the differential 52, and the differential 52 is preferably a rear differential. The advantages of this arrangement are as discussed above in connection with the clutch 26 and differential 30.

The motor 42, in its regenerative mode, is the primary mechanism for charging the batteries 44. However, further efficiency gains can be yielded through the photovoltaic elements 45 and the use of a thermoelectric generator 54 coupled with the radiator 40 of the internal combustion engine 22. Thus, a portion of the excess heat from the engine 22 can be recaptured for battery charging purposes, allowing some battery charging during engine 22 operation outside of deceleration events.

Figure 6:
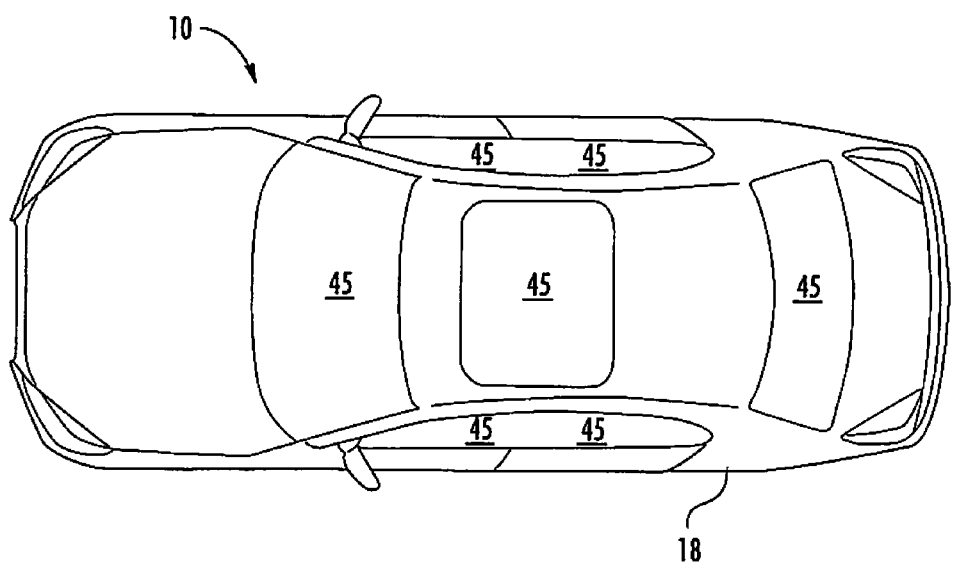
FIG. 6 is a perspective view of an exterior of the hybrid vehicle of FIG. 1, with photovoltaic cells mounted thereon.

Referring to FIG. 6, the photovoltaic elements 45 can be in the form of transparent photovoltaic film built-in the windscreen, the sunroof and windows. Such films can supply, for example, up to 100 W per 10.76 $ft^2$ depending on sun exposure; enough power to recharge (when the vehicle is parked under direct sunlight) or to boost the batteries (when the vehicle is in use).

Referring to FIG. 1, the pneumatic subsystem 16 includes an air motor 60, an air compressor 62 and an air tank 64. The air motor 60 drives the vehicle 10 through an electric clutch 66 and the differential 52, and the air compressor 62 is driven by the vehicle 10 through the differential 52 and an electric clutch 70. Additionally, a temperature drop resulting from use of the air motor 60 can be used in connection with air conditioning and hydrogen generation applications, and compressed air from the tank 64 can be fed to the internal combustion motor 22 in lieu of conventional forced air induction.

Preferably, the air motor 60 and compressor 62 are separate machines and not connected to the same shaft. While dual purpose motor/compressors exist, it is believed that efficiency losses in motor and/or compressor operations of such machines offset the weight and complexity gains associated with separate machines. Additionally, arranging the motor and compressor on separate shafts, driven through separate clutches 66, 70, eliminates the unnecessary rotation of the component not in use. For simplicity, the air motor 60 preferably does not operate in reverse.

The air tank 64 is preferably a light weight, carbon-fiber reinforced resin tank. The tank size and capacity can be determined based on particular vehicle applications; however, a tank capacity of approximately 300 liters pressurized to approximately 300 bars is believed to be suitable for most vehicle applications.

When in use, air supply to the motor 60 from the tank 64 is regulated by a throttle valve 72 operated by the control sub-system 20. A shut-off valve 74 can also be employed. A control valve 76, such as check valve, can control introduction of air from the compressor 62 into the tank 64. One or more relief valves can also be provided in the pneumatic sub-system 16 as protection against over-pressurization. Air dryers can also be provided for the compressed air coming from the compressor 62.

Referring to FIG. 2, depressurization of compressed air from the tank 64 during operation of the air motor 60 will result in a temperature drop. This facilitates the provision of a chemical refrigerant free climate control system 80. The system 80 includes an air duct 82 that passes around the air motor 60 and/or associated piping, an air duct 84 that passes around the cool side of the thermoelectric generator 54, and an air duct 86 that passes around the radiator 40 and the warm side of the thermoelectric generator 54. Air introduction into an interior of the vehicle 10 from the air ducts 82, 84, 86 is controlled by a selector 90, impelled by an electric fan 92. Operation of the selector 90 and fan 92, and under certain circumstances, the thermoelectric generator 54, is controlled by an air conditioning controller 94. Temperature sensors can also communicate with the controller 94, including sensors in the ducts 82, 84, 86 and in the vehicle 10.

When air conditioning is desired by vehicle 10 occupants and the air motor 60 is, or has recently been in operation, such that air can be effectively cooled thereby, air is introduced into the vehicle 10 from the duct 82. If duct 82 air is insufficient for cooling purposes, then additional cold airflow from duct 84 can be generated. Such cold airflow can either be generated by operation of the thermoelectric generator 54 during electricity generation in connection with operation of the internal combustion engine 22, or the thermoelectric generator 54 can be driven in reverse by the batteries 44 to operate as a thermoelectric cooler to provide cooling.

When heat is desired, and the internal combustion engine 22 is, or has recently been in operation, such that air can be effectively heated thereby, air is introduced into the vehicle from the duct 86. If engine 22 heat is insufficient, then the thermoelectric generator 54 can be driven by the batteries to produce heat.

Figure 4:
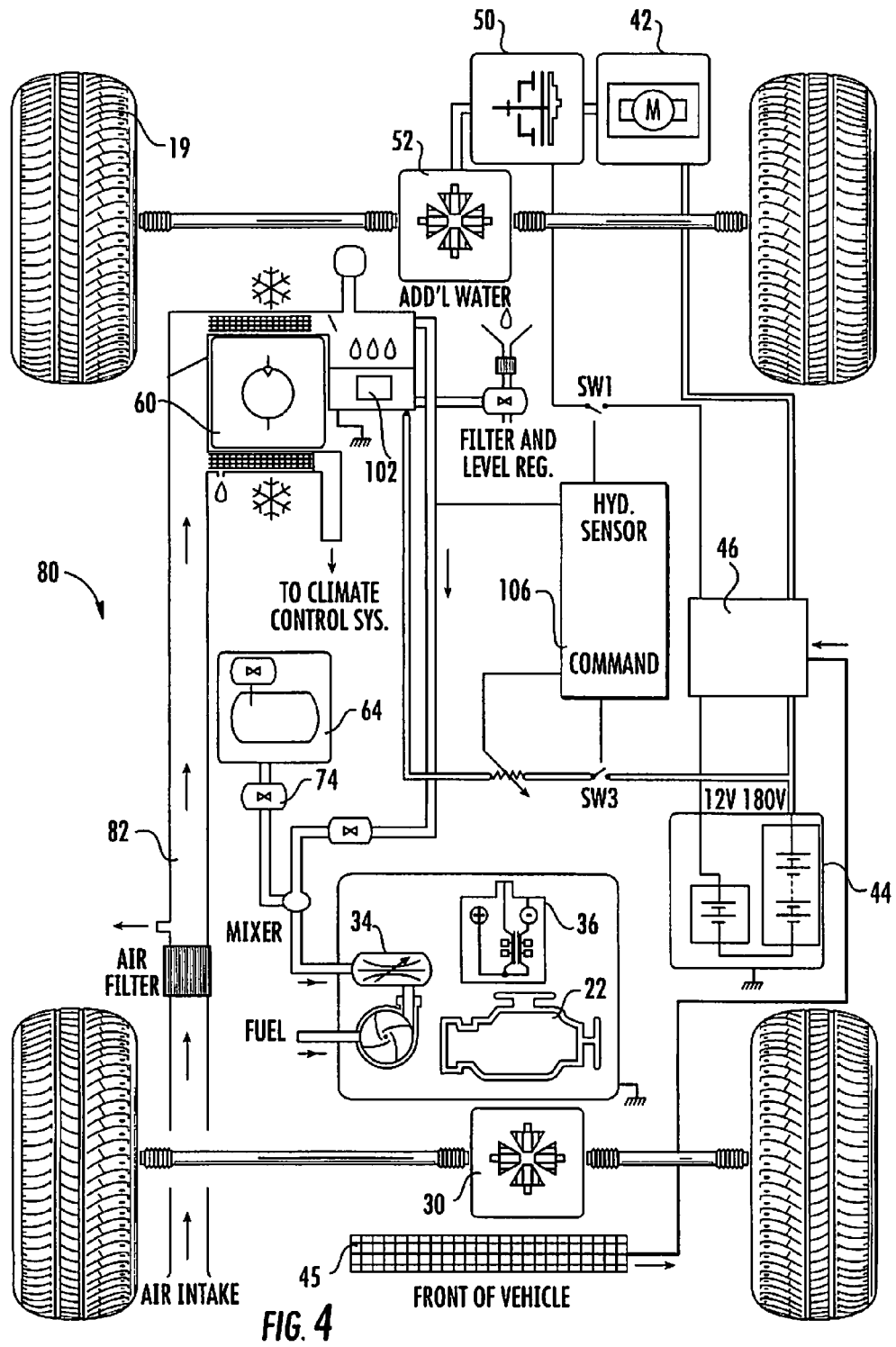
FIG. 4 is a detail schematic view of pneumatic, electrical and internal combustion components of the vehicle of FIG. 1, and especially the hydrogen generator.

Referring to FIG. 4, the temperature drop resulting from operation of the air motor 60 can also condense water from air the duct 82, allowing for a hydrogen generation system 100 that is operable without external water addition. The system 100 includes an electrolysis cell 102, gas piping 104 and a controller 106.

The electrolysis cell 102 is preferably powered from batteries 44, and more preferably, the high voltage battery cells. This significantly higher voltage enhances the electrolysis process relative to many vehicular electrolysis cells running off of 12 volt batteries. If desired, the voltage can be stepped up even higher through intervening electronic circuitry. The electrolysis cell 102 is positioned to collect condensed water from the duct 82. Alternately, a separate water collector can be used from which water is then introduced into the electrolysis cell (from AC drain or rainwater from gutters)

The controller 106 controls the application of voltage to the electrolysis cell 102 based upon the demand for hydrogen. The controller 106 can be in signal communication with a hydrogen sensor in the piping 104. The controller 106 only operates the electrolysis cell 102 during operation of the internal combustion engine 22, when sufficient water is available in the cell 102. Preferably, a user can manually de-select use of the hydrogen generation system 100, if desired.

The hydrogen generated from the electrolysis process, which may be in the form of oxyhydrogen gas, is then introduced into the air intake for the internal combustion engine 22 via the hydrogen piping 104. The oxyhydrogen gas facilitates complete combustion of the fuel, thereby increasing fuel efficiency for a given power level.

In addition to driving the air motor 60, the compressed air in the tank 64 can be used as a substitute for a forced air induction device, such as a turbocharger, during operation of the internal combustion motor 22. As this is not generally an efficiency increasing mechanism, the use of compressed air for a power supplement is preferably only effected based on a manual user selection; for instance, by depressing a "Boost Mode" button. Alternately, the use of the boost mode can be selected automatically by the control sub-system, based on indication of a demand for increased acceleration—for example, when the accelerator pedal is depressed past a predetermined point.

Referring again to FIG. 1, the control subsystem 20 monitors vehicle 10 parameters and, based thereon, controls the charging of the batteries 44 and air tank 64, as well as the driving of the vehicle using the internal combustion engine 22, the electric motor 42 and the air motor 60 (collectively, "drive motors"). Additionally, the control sub-system 20 can preferably receive inputs from, and control operation of, the climate control system 80 and the hydrogen generation system 100.

The control subsystem 20 includes at least one processor 110 with machine readable memory configured to perform control functions in accordance with instructions stored therein. The present invention is not necessarily limited to particular processor types, numbers or designs, to particular code formats or languages, or to particular hardware or software memory media.

The processor 110 receives inputs of vehicle speed, fuel level, gas pedal position, battery charge and air tank pressure from corresponding sensors, and controls a plurality of electrical switches to bring various system components on and off line. In particular, the processor is operable to engage and disengage the clutches 26, 50, 66, 70, and valves 72, 74.

The control sub-system 20 further includes a speed control module 112 which detects gas pedal position, and based on gas pedal position and vehicle speed supplies proportional control signals to the drive motor (or motors) that are currently in use.

Figure 5:
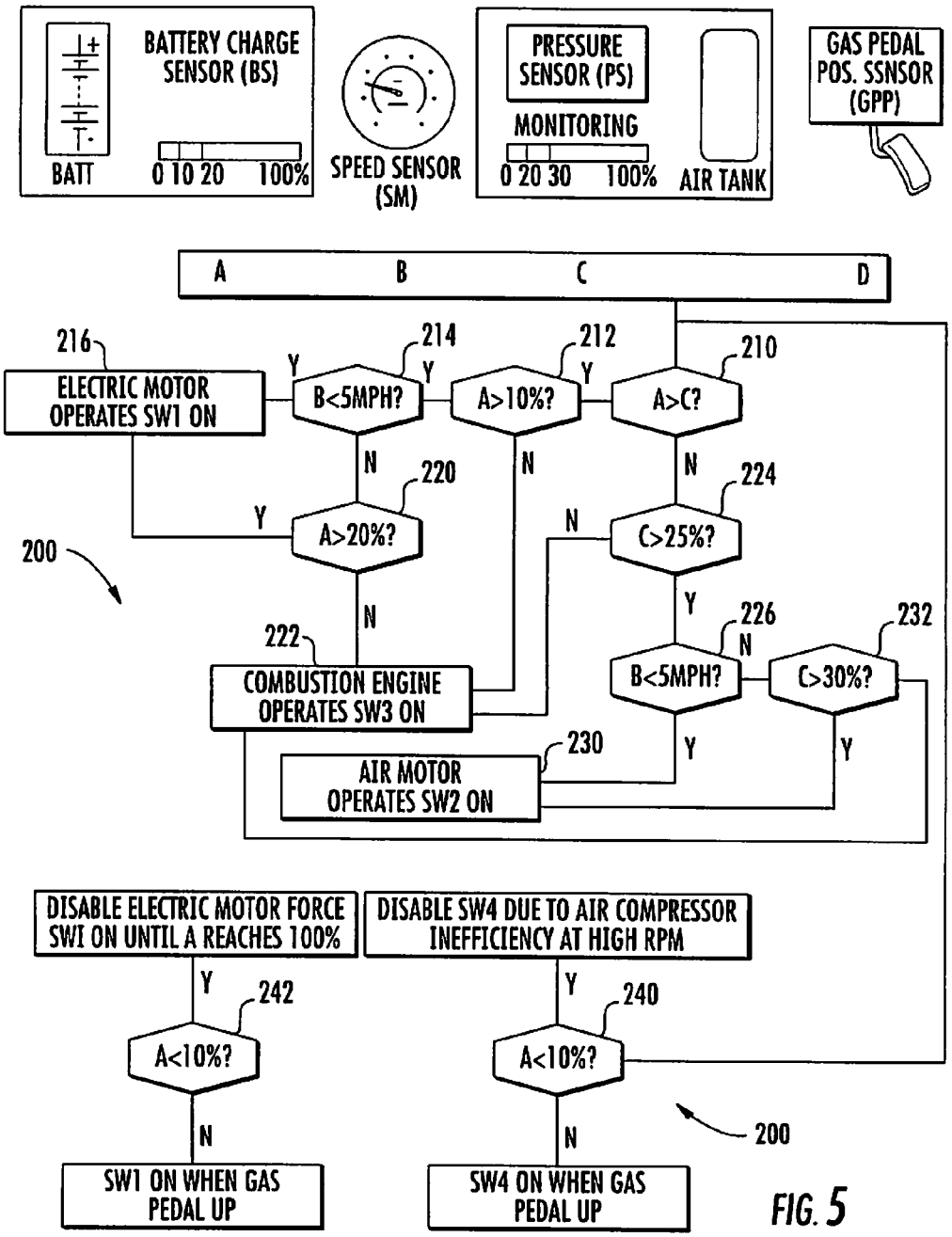
FIG. 5 is a flowchart of control routines executed in connection with operation of the vehicle of FIG. 1.

Referring to FIG. 5, the control routines that the processor 110 is configured to execute include a drive motor selection routine 200 and a kinetic energy recovery control routine 202. Decisions made by the processor 110 in these control routines are governed by inputs of sensed battery charge, vehicle speed, air tank pressure and gas pedal position. As used herein, a "gas pedal" refers generically to a user speed control input, and need not necessarily require an actual pedal. For instance, a hand speed control for an accessibility-equipped vehicle could be considered a "gas pedal," as could a cruise control system mechanism for supplying a speed input.

In the drive motor selection routine 200, a determination 210 is made whether battery charge percentage is greater than air tank pressure percentage. To avoid undue cycling, preferably a control range is used for all comparisons herein. If battery charge is greater, a determination 212 is made whether battery charge is greater than a predetermined absolute minimum battery charge threshold, preferably 10%. If battery charge is greater than the absolute minimum threshold, then a determination 214 is made whether vehicle speed is less than a minimum speed, preferably 5 miles per hour (MPH). If vehicle speed is less than five miles per hour, then the processor engages the clutch 50 and the electric motor 42 is used to drive the vehicle 10 (at block 216).

If vehicle speed is greater than the minimum speed, then a determination 220 is made whether battery charge is greater than a minimum operational battery charge threshold, preferably 20%. If the battery charge is greater than the minimum operational charge threshold, then the electric motor 42 is used to drive the vehicle (returning to block 216). If the battery charge is determined to be less than the absolute minimum or operational minimum charge thresholds, then the processor engages the clutch 26 and the internal combustion motor 22 is operated (at block 222).

If it is determined (returning to determination 210) that battery charge was less than air tank pressure, then a determination 224 is made whether air tank pressure is above an absolute minimum threshold, preferably 25%. If air tank pressure is above the absolute minimum threshold, then a determination 226 is made whether vehicle speed is less than the minimum speed. If vehicle speed is less than the minimum speed, then the clutch 66 is engaged and the air motor 60 is operated (at block 230).

If vehicle speed is above the minimum speed, a determination 232 is made whether air tank pressure is above a minimum operational threshold, preferably 30%. If air tank pressure is above the minimum operational threshold, then the air motor 60 is operated (returning to block 230). If the air tank pressure is determined to be less than the absolute minimum or operational minimum charge thresholds, then the processor engages the clutch 26 and the internal combustion engine 22 is operated (returning to block 222).

The processor 110 preferably repeats the drive motor selection routine 200 continuously during operation of the vehicle 10. The present invention is not necessarily limited to this drive motor selection routine, and other routines could be used, including, for example, routines in which more than one drive motor was used to drive the vehicle at a given time. However, the above routine advantageously yields high fuel efficiency while not requiring complex electrical or mechanical coordination of drive motors.

Additionally, the drive motor selection routine 200 automatically works to maintain battery charge and/or air tank pressure above absolute minimum thresholds so that the air and/or electric motor 62, 42 will always be available to drive the vehicle below the minimum speed. Correspondingly, no starter is required for the internal combustion engine 22, as the vehicle speed can, itself, be used to turn the engine over for starting. The weight of the vehicle can thereby be reduced. Also, the internal combustion engine 22 will generally always be turned off at idle to minimize vehicle 10 emissions. In general, the only energy input to the vehicle 10 that is ever required is the addition of fuel, and no external charger for air or electricity is required—although the present invention could be configured to accept such inputs.

The kinetic energy recovery routine 202 will normally operate to engage clutches 50 and 70 whenever battery charge and air tank pressure are less than maximum (i.e., 100%) and lifting of the acceleration pedal is detected. The electric motor 42 will then be operated in regenerative mode and the air compressor 62 will be operated to recharge the batteries and air tank, respectively.

However, if a determination 240 is made that vehicle speed is above an air charging threshold, preferably 60 MPH, then the air compressor 62 is not operated due to the inefficiency of high speed operation of typical air compressors. The threshold could be adjusted or eliminated based on compressor type and if a gear box is used to reduce the speed of air compressor operation. Additionally, in the interest of simplicity, preferably the air compressor is not used to recapture kinetic energy with the vehicle moving in reverse.

Additionally, to ensure adequate battery power at all times, if a determination 242 is made that battery charge is less than the absolute minimum threshold, then the clutch 50 is engaged and the electric motor 42 is only operated in regenerative mode until the battery is fully charged.

The simultaneous recovery of kinetic energy through both battery charging and air compression typically performed by the present invention can offer a synergistic benefit. Generally, batteries can only usefully absorb a charge at or below a certain rate. This is particularly true of more conventional, less expensive battery types. The simultaneous operation of the air compressor 62 results in the capture of excess energy during deceleration that would otherwise be lost.

From the foregoing, it will be appreciated that the vehicle 10 has the potential to realize significant efficiency gains over conventional hybrid vehicles, without requiring exotic batteries or other specialized components. Thus, the vehicle 10 can be produced more cost competitively with conventional vehicles.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A hybrid vehicle comprising:
   a frame;
   at least two wheels carried by the frame;
   an internal combustion subsystem driving at least one of the two wheels;
   an electrical subsystem driving at least one of the two wheels and recapturing kinetic energy during deceleration events;
   a pneumatic subsystem driving at least one of the two wheels and recapturing kinetic energy during deceleration events; and
   a control subsystem selectively operating the internal combustion, electrical and pneumatic subsystems;
   wherein the control subsystem includes at least one processor with machine readable memory configured to:
      receive inputs of a battery charge, vehicle speed, air tank pressure and gas pedal position; and
      execute drive motor selection and kinetic energy recovery routines based on the received inputs.

2. The hybrid vehicle of claim 1, wherein the internal combustion subsystem drives a different one of the at least two wheels than the electric and pneumatic subsystems.

3. The hybrid vehicle of claim 1, wherein the at least two wheels include at least one front wheel and at least one rear wheel, the internal combustion subsystem driving the at least one front wheel and the electric subsystem and the pneumatic subsystem driving the at least one rear wheel.

4. The hybrid vehicle of claim 1, further comprising at least three electrically-operated clutches operated by the control system to selectively engage the internal combustion, electrical and pneumatic subsystems, respectively.

5. The hybrid vehicle of claim 1, wherein the internal combustion subsystem includes an internal combustion motor and a continuously variable transmission.

6. The hybrid vehicle of claim 1, wherein the internal combustion subsystem includes a transmission, a clutch, and a differential through which the at least one of the at least two wheels is driven, the clutch being located between the transmission and the differential and controlled by the control subsystem.

7. The hybrid vehicle of claim 6, wherein the clutch is proximate to the differential.

8. The hybrid vehicle of claim 1, wherein the electrical subsystem includes an electric motor for driving the at least one of the at least two wheels, at least one battery storing electrical power and a charge regulator selectively charging the at least one battery.

9. The hybrid vehicle of claim 1, wherein the pneumatic system includes an air motor for driving the at least one of the at least two wheels, an air compressor compressing air during deceleration events, and air tank storing compressed air.

10. The hybrid vehicle of claim 9, wherein the air tank is a carbon-fiber reinforced resin tank.

11. The hybrid vehicle of claim 9, wherein the air tank has a capacity of approximately 300 liters pressurized to approximately 300 bars.

12. The hybrid vehicle of claim 9, wherein the pneumatic subsystem further includes a throttle valve controlled by the control subsystem regulating air supply from the air tank to the air motor.

13. The hybrid vehicle of claim 1, further comprising a climate control system selectively introducing heated and cooled air into the hybrid vehicle, the cooled air being cooled by a temperature drop resulting from the depressurization of air in the pneumatic subsystem.

14. The hybrid vehicle of claim 13, further comprising a thermoelectric generator, the climate control system also using the thermoelectric generator to generate the cooled air.

15. The hybrid vehicle of claim 1, wherein the pneumatic subsystem supplies compressed air to the internal combustion subsystem as a substitute for forced air induction.

16. The hybrid vehicle of claim 1, wherein the drive motor selection routine operates a drive motor from only one of the internal combustion, electrical and pneumatic subsystems at a time.

17. The hybrid vehicle of claim 1, wherein the drive motor selection routine dictates always maintaining the battery charge and the air tank pressure above respective absolute minimum thresholds.

18. The hybrid vehicle of claim 17, wherein if battery charge falls below the absolute minimum threshold for battery charge, then the drive motor selection routine dictates not using the electrical subsystem to drive the at least one of the at least two wheels until the battery is fully charged.

19. The hybrid vehicle of claim 17, wherein, the internal combustion subsystem does not include a starter motor and vehicle speed above a predetermined minimum speed is used to start an internal combustion motor of the internal combustion subsystem.

20. The hybrid vehicle of claim 19, wherein, if the vehicle speed is above the predetermined minimum speed, the drive motor selection routine dictates only using the electrical subsystem or the pneumatic subsystem to drive the at least one of the at least two wheels if the battery charge or the air tank pressure, respectively, are above respective minimum operational thresholds, the respective minimum operational thresholds being higher than the respective absolute minimum thresholds.

21. The hybrid vehicle of claim 20, wherein the drive motor selection routine selects between using the electrical subsystem and the pneumatic subsystem to drive the at least one of the at least two wheels based on a comparison between battery charge and air tank pressure.

22. The hybrid vehicle of claim 1, wherein if the battery charge is less than maximum, the kinetic energy recovery routine dictates using the electrical subsystem to recover kinetic energy to increase battery charge when lifting of the acceleration pedal is detected.

23. The hybrid vehicle of claim 22, wherein if pneumatic charge is also less than maximum, the kinetic energy recovery routine can dictate using both the electrical subsystem and the pneumatic subsystem to recover kinetic energy simultaneously.

24. The hybrid vehicle of claim 23, wherein the pneumatic subsystem is not used for kinetic energy recovery if vehicle speed is determined to be above an air charging threshold.

25. A hybrid vehicle comprising:
a frame;
at least two wheels carried by the frame;
an internal combustion subsystem driving at least one of the two wheels;
an electrical subsystem driving at least one of the two wheels and recapturing kinetic energy during deceleration events;
a pneumatic subsystem driving at least one of the two wheels and recapturing kinetic energy during deceleration events; and
a control subsystem selectively operating the internal combustion, electrical and pneumatic subsystems;
wherein the electrical subsystem includes an electric motor for driving the at least one of the at least two wheels, at least one battery storing electrical power and a charge regulator selectively charging the at least one battery; and
wherein the electric motor is an asynchronous induction regenerative motor with field induction current supplied as a pulse width modulated signal, such that, when driving the at least one of the at least two wheels, the induction current is supplied by the at least one battery, and, when recapturing kinetic energy during deceleration events, induced current is routed back to the at least one battery.

26. A hybrid vehicle comprising:
a frame;
at least two wheels carried by the frame;
an internal combustion subsystem driving at least one of the two wheels;
an electrical subsystem driving at least one of the two wheels and recapturing kinetic energy during deceleration events;
a pneumatic subsystem driving at least one of the two wheels and recapturing kinetic energy during deceleration events; and
a control subsystem selectively operating the internal combustion, electrical and pneumatic subsystems;
wherein the electrical subsystem includes an electric motor for driving the at least one of the at least two wheels, at least one battery storing electrical power and a charge regulator selectively charging the at least one battery; and
wherein the electric subsystem has at least two batteries including a first battery and a second battery having a lower voltage than the first battery, the first battery driving the electric motor and the second battery powering other vehicle loads.

27. The hybrid vehicle of claim 26, wherein the first battery has a nominal voltage of approximately 180 volts DC and the second battery has a nominal voltage of approximately 12 volts DC.

28. A hybrid vehicle comprising:
a frame;
at least two wheels carried by the frame;
an internal combustion subsystem driving at least one of the two wheels;
an electrical subsystem driving at least one of the two wheels and recapturing kinetic energy during deceleration events;
a pneumatic subsystem driving at least one of the two wheels and recapturing kinetic energy during deceleration events; and
a control subsystem selectively operating the internal combustion, electrical and pneumatic subsystems;
wherein the electrical subsystem includes an electric motor for driving the at least one of the at least two wheels, at least one battery storing electrical power and a charge regulator selectively charging the at least one battery; and
wherein the electrical subsystem also includes a clutch controlled by the control subsystem, the electric motor drives the at least one of the at least two wheels through a differential and the clutch is proximate to the differential.

29. A hybrid vehicle comprising:
a frame;

at least two wheels carried by the frame;
an internal combustion subsystem driving at least one of the two wheels;
an electrical subsystem driving at least one of the two wheels and recapturing kinetic energy during deceleration events;
a pneumatic subsystem driving at least one of the two wheels and recapturing kinetic energy during deceleration events; and
a control subsystem selectively operating the internal combustion, electrical and pneumatic subsystems;
wherein the electrical subsystem includes an electric motor for driving the at least one of the at least two wheels, at least one battery storing electrical power and a charge regulator selectively charging the at least one battery; and
wherein the electrical subsystem further includes photovoltaic cells arranged on the vehicle and generating electrical power for charging of the at least one battery.

30. A hybrid vehicle comprising:
a frame;
at least two wheels carried by the frame;
an internal combustion subsystem driving at least one of the two wheels;
an electrical subsystem driving at least one of the two wheels and recapturing kinetic energy during deceleration events;
a pneumatic subsystem driving at least one of the two wheels and recapturing kinetic energy during deceleration events; and
a control subsystem selectively operating the internal combustion, electrical and pneumatic subsystems;
wherein the electrical subsystem includes an electric motor for driving the at least one of the at least two wheels, at least one battery storing electrical power and a charge regulator selectively charging the at least one battery; and
further comprising a thermoelectric generator converting excess heat from the internal combustion subsystem and generating electrical power therefrom for charging of the at least one battery.

31. A hybrid vehicle comprising:
a frame;
at least two wheels carried by the frame;
an internal combustion subsystem driving at least one of the two wheels;
an electrical subsystem driving at least one of the two wheels and recapturing kinetic energy during deceleration events;
a pneumatic subsystem driving at least one of the two wheels and recapturing kinetic energy during deceleration events; and
a control subsystem selectively operating the internal combustion, electrical and pneumatic subsystems;
wherein the pneumatic system includes an air motor for driving the at least one of the at least two wheels, an air compressor compressing air during deceleration events, and air tank storing compressed air; and
wherein the air motor and the air compressor are mounted on different shafts and connected to the at least one of the at least two wheels through respective clutches controlled by the control subsystem.

32. The hybrid vehicle of claim 31, wherein the air motor and the air compressor are connected to the at least one of the at least two wheels through a common differential, both of the respective clutches being located proximate to the common differential.

33. A hybrid vehicle comprising:
a frame;
at least two wheels carried by the frame;
an internal combustion subsystem driving at least one of the two wheels;
an electrical subsystem driving at least one of the two wheels and recapturing kinetic energy during deceleration events;
a pneumatic subsystem driving at least one of the two wheels and recapturing kinetic energy during deceleration events;
a control subsystem selectively operating the internal combustion, electrical and pneumatic subsystems; and
a hydrogen generation system including an electrolysis cell for generating hydrogen and piping for introducing the hydrogen to the internal combustion subsystem.

34. The hybrid vehicle of claim 33, wherein water for the electrolysis cell is supplied by condensation formed by a temperature drop resulting from the depressurization of air in the pneumatic subsystem.

* * * * *